US008572286B2

(12) United States Patent
Bachmann et al.

(10) Patent No.: US 8,572,286 B2
(45) Date of Patent: Oct. 29, 2013

(54) METHOD AND APPARATUS FOR MAPPING AN APPROPRIATE SERVICE VERSION FOR A CLIENT

(75) Inventors: Hans Ruediger Bachmann, Heidelberg (DE); Vladislav Bezrukov, Sandhausen (DE); Timm Falter, Sinsheim (DE); Claus von Riegen, Wiesloch (DE); Alexander Zubev, Pazardjik (BG)

(73) Assignee: SAP AG, Walldorf (DE)

( * ) Notice: Subject to any disclaimer, the term of this patent is extended or adjusted under 35 U.S.C. 154(b) by 1657 days.

(21) Appl. No.: 11/751,531

(22) Filed: May 21, 2007

(65) Prior Publication Data

US 2008/0291908 A1    Nov. 27, 2008

(51) Int. Cl.
*G06F 15/16*    (2006.01)
*G06F 15/173*    (2006.01)

(52) U.S. Cl.
USPC .......................................... 709/242; 709/227

(58) Field of Classification Search
USPC .......................................... 709/227, 238, 242
See application file for complete search history.

(56) References Cited

U.S. PATENT DOCUMENTS

| | | | |
|---|---|---|---|
| 2002/0174117 | A1 | 11/2002 | Nykanen |
| 2002/0178254 | A1* | 11/2002 | Brittenham et al. .......... 709/224 |
| 2003/0208572 | A1 | 11/2003 | Shah et al. |
| 2004/0107196 | A1 | 6/2004 | Chen et al. |
| 2004/0193635 | A1* | 9/2004 | Hsu et al. ....................... 707/102 |
| 2005/0038771 | A1 | 2/2005 | Sugihara et al. |
| 2005/0131912 | A1 | 6/2005 | Lin et al. |
| 2006/0095576 | A1* | 5/2006 | Perry et al. .................... 709/227 |
| 2006/0173987 | A1* | 8/2006 | Friesen et al. ................. 709/223 |

OTHER PUBLICATIONS

Non-Final Office Action for U.S. Appl. No. 11/643,413 Mailed Nov. 24, 2008, 15 pages.

* cited by examiner

*Primary Examiner* — Brian J Gillis
(74) *Attorney, Agent, or Firm* — Schwegman Lundberg & Woessner, P.A.

(57) ABSTRACT

Distributed data processing systems that provide services at two network addresses have their interfaces described in a published interface description document available at a Uniform Resource Locator ("URL"). The interface description of the second of the services replaces the interface description of the first of the services. Related methods, computer readable media, and systems to benefit from an embodiment of the invention are also described and claimed.

17 Claims, 6 Drawing Sheets

Example structure continued in Fig. 2B

METHOD AND APPARATUS FOR MAPPING AN APPROPRIATE SERVICE VERSION FOR A CLIENT

FIELD

The invention relates to version management in distributed computing systems. More specifically, the invention relates to accessing an appropriate version of a distributed data processing service.

BACKGROUND

Contemporary data processing activities are frequently distributed among a number of independent computer systems that use a communication fabric such as a local- or wide-area network to coordinate their operations. This model of data processing is generally more complex and somewhat less efficient than older arrangements where a complete, clearly-defined processing operation occurs at a single system and a "finished" data product may be transmitted to another location. In a distributed system, it is not uncommon for portions of closely-linked processing sequences to occur on different systems, with both partially-processed data and executable code passing between the systems over a communication link.

Various advantages are available from distributed processing. For example, computationally expensive or time-consuming operations can be consolidated and performed by a system designed specifically to perform those operations quickly; competing providers of standardized processing can establish a market to provide the services at a range of price/performance points; and decoupling phases of a processing sequence can make it easier to design robust systems that can continue operation despite failures of individual machines or communication links.

One difficulty that arises in designing and operating distributed data processing systems is in specifying the interfaces through which cooperating processing elements will communicate. Standards such as the Common Object Request Broker Architecture ("CORBA") by the Object Management Group ("OMG") consortium and the Web Services Description Language ("WSDL") by the international World Wide Web Consortium ("W3C") provide a great deal of guidance in this area, but even assuming that all interoperational difficulties that are common to distributed systems could be addressed by the standards, challenges arising from the lack of centralized control of all the components of a distributed system remain. That is, in a process that involves operations and services sourced from different providers, changes in an underlying service can disrupt the overall process. Methods of advertising and providing services that avoid disruptions while still permitting the service provider to change, enhance or repair the service may be of value in this field.

SUMMARY

Embodiments of the invention permit a service provider that advertises and provides a distributed data processing service to its clients to offer a changed version of the service without affecting existing clients and without altering the service request protocol to include a version number or other similar versioning information.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Embodiments of the invention can be applied as "best practices" methods for operating or participating in a distributed data processing environment. Resources, tools and protocols upon which a distributed environment is built may permit arbitrarily complex interactions and usage patterns, but certain patterns—even counterintuitive patterns—may give unexpectedly good results. As discussed below, updated but backwards-compatible versions of a distributed data processing service are offered at different network addresses, although there may be no technical reason that the new service could not be provided at the old network address. Various benefits of this approach are described.

Figure 1:
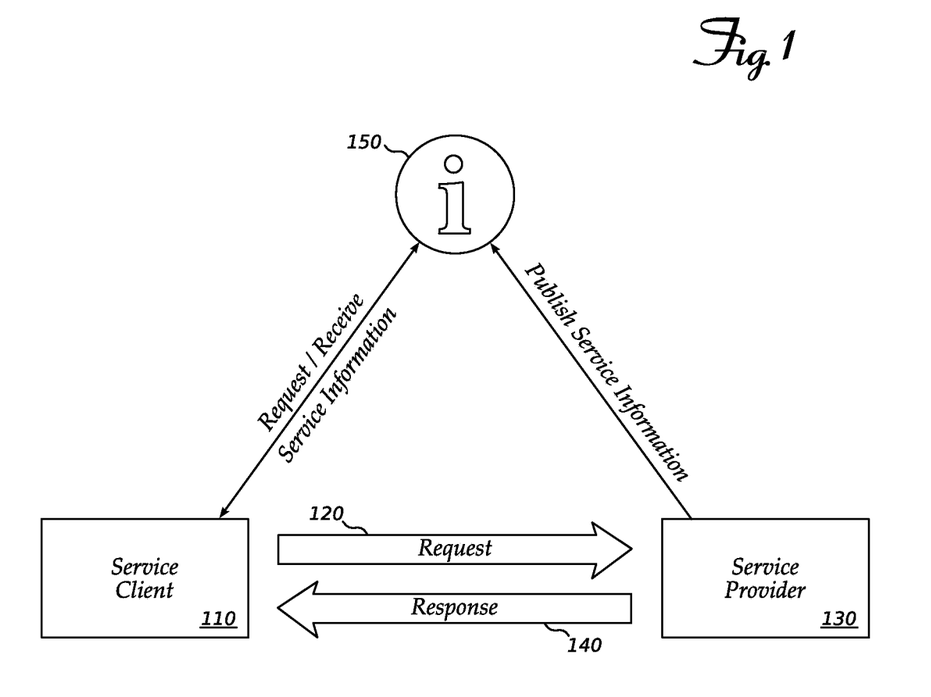
FIG. 1 shows a logical overview of an environment where embodiments of the invention may be used.

FIG. 1 shows a logical overview of an environment where a distributed data processing service can operate. The essential features of a distributed computation system are a service client 110, which transmits a request 120 to a service provider 130 and receives a response 140 in return. In some systems, including those that implement an embodiment of the invention, an information broker 150 may be used to make it easier for service client 110 to find a provider that offers the desired service and to discover the protocol that provider requires. The Universal Description, Discovery and Integration ("UDDI") specification prepared by the international Organization for the Advancement of Structured Information Standards ("OASIS") consortium describes one possible information broker architecture. Other environments may provide similar functionality (for example, CORBA provides an Object Request Broker or "ORB" to act as an information clearinghouse). In the following material, the specific example of a UDDI server will be considered. Information broker 150 (or an associated system in a similar relationship to service client 110 and service provider 130) may provide other information and services to support embodiments of the invention. These other services will be described below.

Figure 2A:
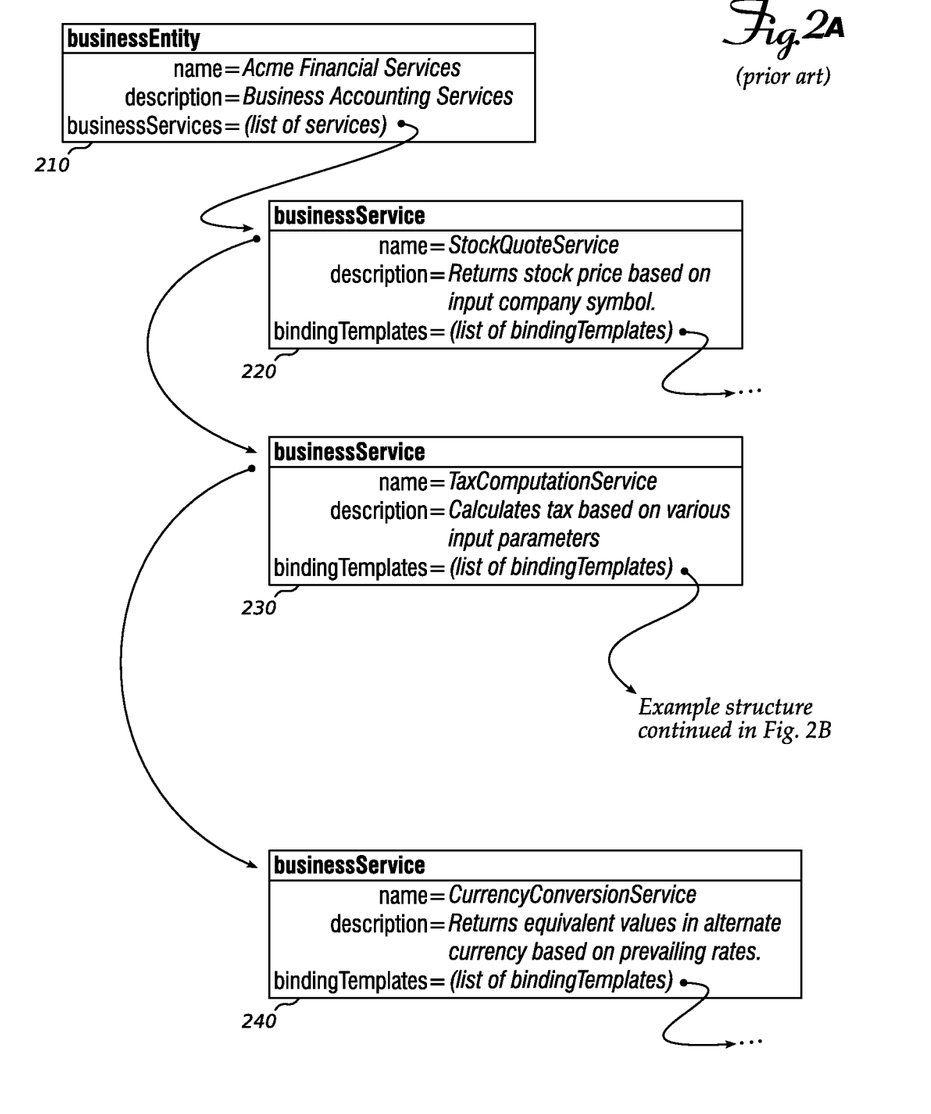
FIGS. 2A and 2B show relationships between data structures that are involved in embodiments of the invention.
Figure 2B:
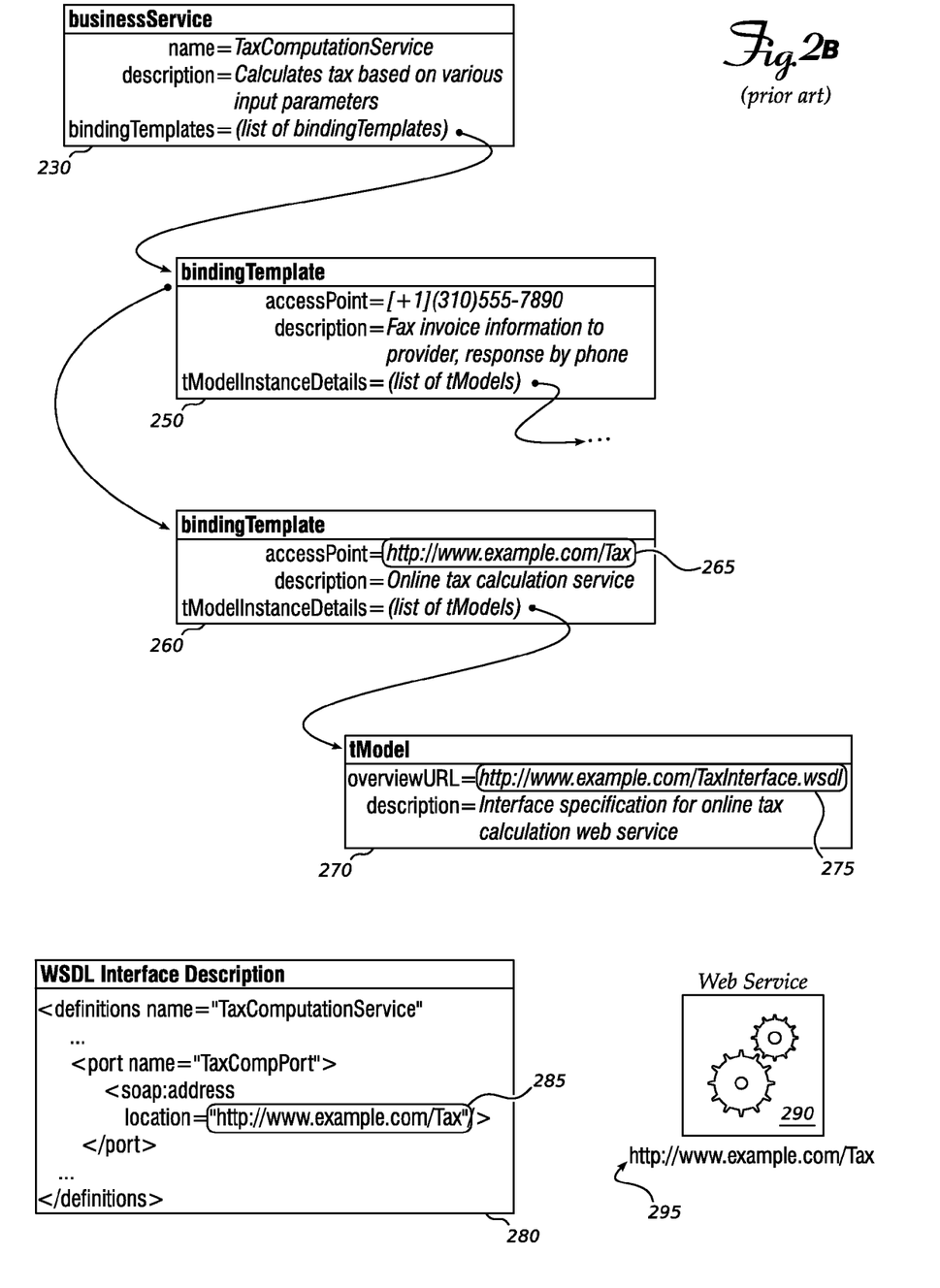

A UDDI registry, as described and specified by the OASIS consortium, maintains and responds to queries about several different types of data, all typically describing service-providing businesses and the services they provide. FIGS. 2A and 2B show several types of data structures that a UDDI registry maintains about a service provider. The example structures shown here describe a financial services corporation and some of the services it offers. The hierarchical structure discussed will resemble structures describing other companies listed in the registry.

Beginning in FIG. 2A, a business entity record 210 may represent a company or other organization that offers one or more distributed data processing services (hereinafter "web services"). A UDDI server may permit a client to search for business entities by name or by other identifying information. Business entity record 210 may be associated with several business service records 220, 230, 240. Business service records represent a service offered by the associated business entity 210. Services may be real-world functions such as a telephone help desk or a repair facility, or they may be web services such as the return of financial or weather information, or the calculation of a tax amount based on information about goods or services, the purchaser and seller, and the like.

FIG. 2B shows deeper levels of the UDDI data hierarchy. Beginning with business service record 230 (reproduced from FIG. 2A), binding template records 250 and 260 provide information about ways to access the business service. At the lowest level, a technical model ("tModel") structure 270 provides a link 275 to a Web Services Description Language ("WSDL") document 280 containing information a distributed application developer might need to access the business service described by UDDI business service record 230. For example, WSDL document 280 may contain a Uniform Resource Locator 285 that an application can use to communicate with web service 290, deployed at URL 295. WSDL document 280 is often available from a different server than the UDDI server. A URL in tModel 270 allows the developer to obtain the document.

Those familiar with UDDI will recognize that some hierarchical details have been omitted. These details are not essential to an understanding of embodiments of the present invention, and would unnecessarily complicate the following discussion.

Figure 3:
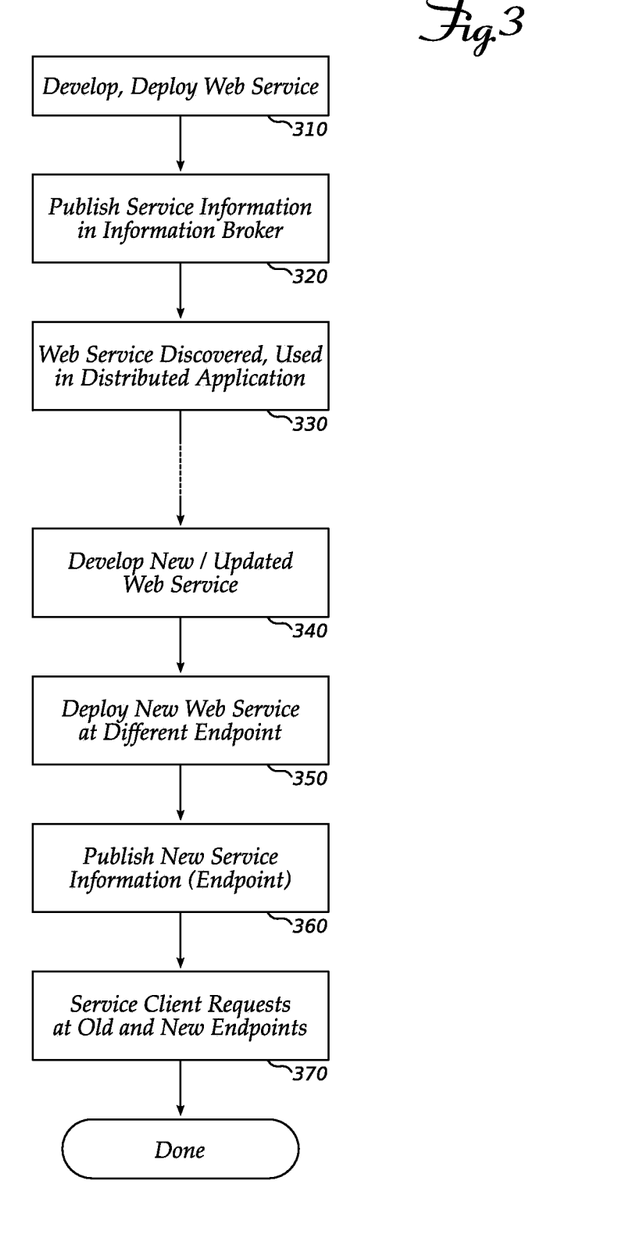
FIG. 3 is a flow chart outlining operations according to an embodiment of the invention.

Embodiments of the invention use the following "best practices" (or preferred methods) for dealing with changes (error corrections, increases in functionality, etc.) to a web service. Referring to FIG. 3, a first version of a web service is developed and deployed (310). Information to permit web service clients to find and use the web service is published in an information broker such as a UDDI server (320). This information may be similar in form and/or content to the hierarchical set of records discussed with reference to FIGS. 2A and 2B. Web service clients may adopt the web service and incorporate it into their distributed data processing applications (330).

Later, the web service provider develops a new web service (340). The new web service may correct errors present in the first web service, provide increased functionality over the first web service, or otherwise be related to the first web service as a "new version."

Although some new versions of a web service could be substituted for the original service and "swapped in" transparently, so that the new service is accessed at the same endpoint (i.e. Uniform Resource Locator or "URL") published previously, embodiments of the invention introduce a new endpoint even when this is not necessary. Thus, the new web service is deployed at a different endpoint from the first web service (350).

Next, information about the new web service is published in the information broker (360). This information includes at least the new endpoint where the web service is provided. It may also include (in the UDDI case) new binding templates, tModels, and/or WSDL documents as necessary to describe the use of the web service to a client. For some types of changes, the information about the new web service can overwrite or modify previously published information, while other types of changes may require entirely new information to be published. Note that if previously-published information is overwritten, the old endpoint will no longer be visible in the information broker.

Finally, web service client requests received at both the old endpoint and the new endpoint are serviced (370). In other words, the old endpoint is kept active despite the fact that its location (URL) may no longer be given out by the information broker. Service at the old endpoint can be provided by the old web service application, by a "wrapper" or "forwarding" application that sends an old client's requests to the new web service, or by configuring the new web service to respond at both the old and new endpoints.

The sorts of web service changes that do not require a new endpoint range from the trivial to the relatively complex. For example, if a human-readable message produced by the web service contains a misspelling, a new web service that corrects the misspelling could very likely be deployed at the old endpoint address without ill effects. At the other end of the scale, a web service could be modified to accept new, optional parameters and operate differently if the optional parameters were supplied. A client adapted to interact with the old web service might be able to interact with the new service as well, though the client knows nothing of the new parameters.

As described above, embodiments of the invention deploy a new (updated) web service at a new endpoint even if the new service could be offered at the old endpoint. Stated with greater precision: if a client adapted to interact successfully with a first web service can also interact successfully with a second web service, then the second web service could be offered at the same endpoint as the first web service. However, according to an embodiment of the invention, the second web service is offered at a new, different endpoint.

It is appreciated that a new, incompatible web service could, technically, be offered at the same endpoint as an older web service. This is unlikely to be done, however, because it would result in operational failures whenever an old client tried to interact with the new web service.

When a web service provider deploys and publicizes services as described here, the services can evolve (through correction of errors and addition of functionality) with less disruption to existing clients. Current client software will continue to obtain web services by interacting with the web service at the old endpoint, while new clients will only discover the new service offered at the new endpoint when they query the information broker. Thus, a web services provider can accomplish a "soft" deprecation of an older web service by encouraging new clients to use the new service without impairing older clients' use of the original service. (As used herein, "deprecate" means to discourage the use of the existing web service, without actually discontinuing the service.)

Furthermore, embodiments of the invention permit web service providers to track clients' use of various service versions and to perform additional checks to improve robustness. Clients implicitly identify the version of service for which they were developed by the endpoint or URL they use to contact the server. No explicit version number need be included in the data a client sends to the server. Old clients will connect to the old endpoint, while new clients (even new clients of backwards-compatible web services) will connect to the new endpoint because the old endpoint is no longer distributed by the information broker. The endpoint used can permit the web service to refine its processing of information from the client. For example, if a "compatible" web service is developed that permits requests to include a new, optional parameter, a request sent to the old endpoint should not include the parameter, even if the web service could process it. The original interface, associated with the old endpoint, did not define the optional parameter, so a client that sends the optional parameter to the old endpoint is operating erratically.

Figure 4:
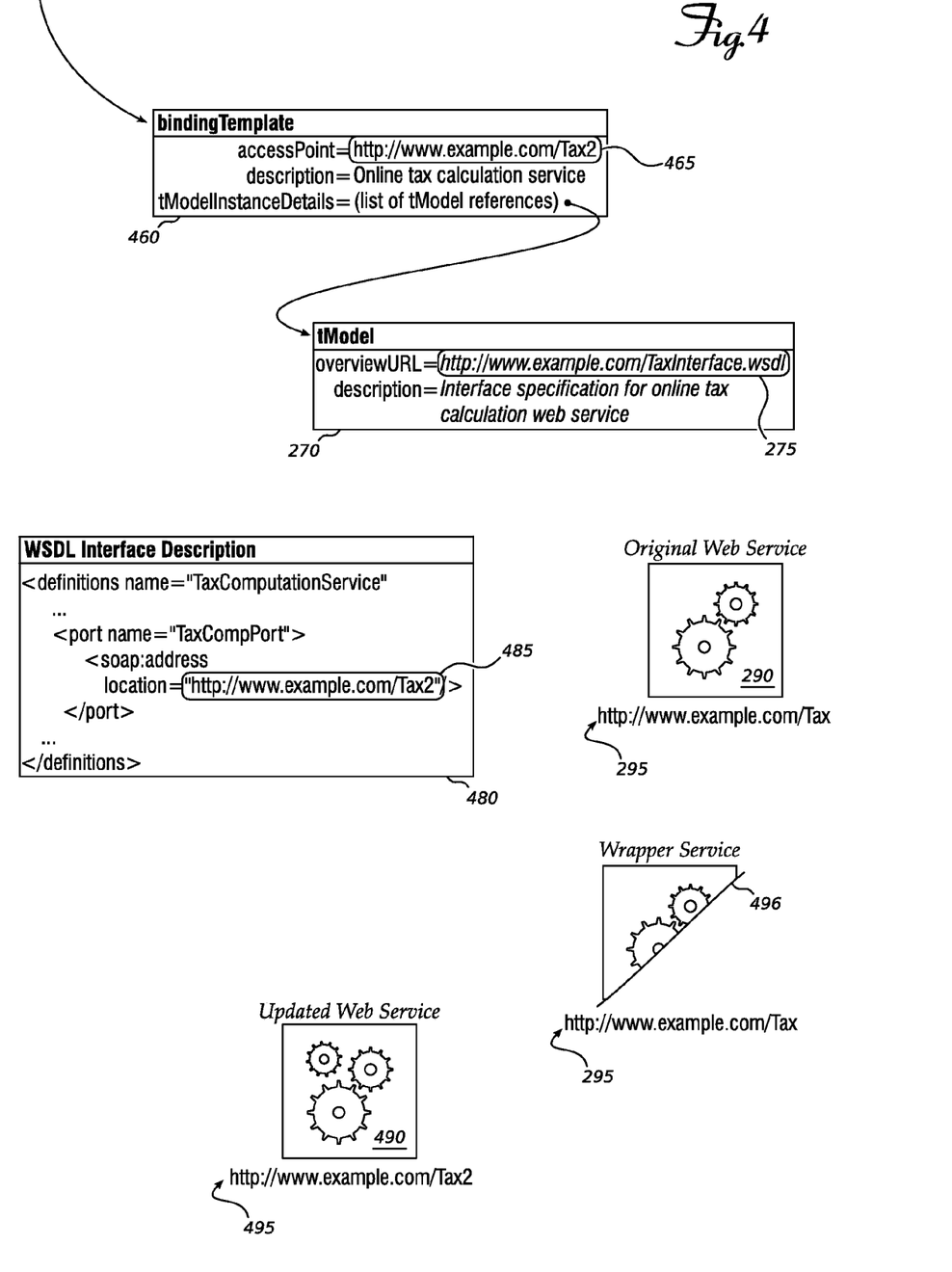
FIG. 4 shows how information broker and related data structures may change when an embodiment of the invention is applied.

FIG. 4 shows a portion of the hierarchical data structure and associated records discussed with reference to FIGS. 2A and 2B, and how certain data structures may change when an embodiment of the invention is used. The first change visible in FIG. 4 is to bindingTemplate 260, which becomes bindingTemplate 460 when the network address of the updated service is published as accessPoint 465, replacing the old access point 265. The new network address is also substituted into the existing WSDL interface description document 280 to produce the altered interface description 480 (element 485 indicates the altered endpoint address). WSDL interface description 460 will also be modified to include the new parameters or other information pertaining to the updated service, although these items are not shown in this figure. Updated web service 490 will be deployed at URL 495. However, note that tModel 270 (and in particular overviewDoc URL 275, which specifies a location from which WSDL interface description document 480 can be obtained) has not been altered. (In some embodiments, tModel 270 may be re-saved even though it has not changed.) The new WSDL document 480 will be delivered to clients requesting the resource at the old WSDL URL 275.

The original web service 290 can continue to be provided at its original URL, or a wrapper service 496 may be provided to receive requests according to the old interface protocol at the original URL, to translate the request and send it to the updated web service 490, and to translate the response and return it to the old client.

In some embodiments, the updated web service may accept connections at both the old service point and the new service point. In this case, input parameters may be deserialized differently, and/or the response results may be serialized differently, depending on the endpoint at which a request is received. Serialization and deserialization refer to the process of converting data between a first form suitable for transmission over a communication link between client and server and a second form suitable for use within the client or server system. Many contemporary distributed data processing systems use interface definition documents containing Extensible Markup Language ("XML") descriptions of the messages a web service client and server may exchange. A web service can select an appropriate XML document based on the endpoint at which a client connects.

Accepting service requests at two different ports or access URLs permits different input parameters to be received and different output results to be provided, without requiring the client to provide an explicit indicator of the protocol version it desires. In effect, the address at which the client connects to the service implicitly indicates the interface version the client wishes to use. The distributed data service application can use this implicit version information to control the deserialization of input parameters and the serialization of output results.

Developing, describing, and publishing information about web services as described in the foregoing paragraphs can permit a web services provider to deprecate a web service without actively publishing or announcing the deprecation. A "soft" or even "silent" deprecation such as may be achieved according to an embodiment may be useful in an environment where changes to published information are announced and pushed to clients, or are routinely discovered during client polling of published information. By avoiding the notification, existing clients can continue to use the deprecated service without interruption, but newly-developed client applications will discover and use the new service interface.

Embodiments of the invention may be particularly useful in environments where service requests are to be accepted from clients that require a variety of different interface parameters (e.g. optional and mandatory input parameters, processing controls, and/or output results). The interfaces may be associated with the programming languages in which the client applications are created. For example, multiple interface description documents may be registered in connection with a single basic network service to support connections from clients written in Java, the Advanced Business Application Programming ("ABAP") language, or another programming language.

Figure 5:
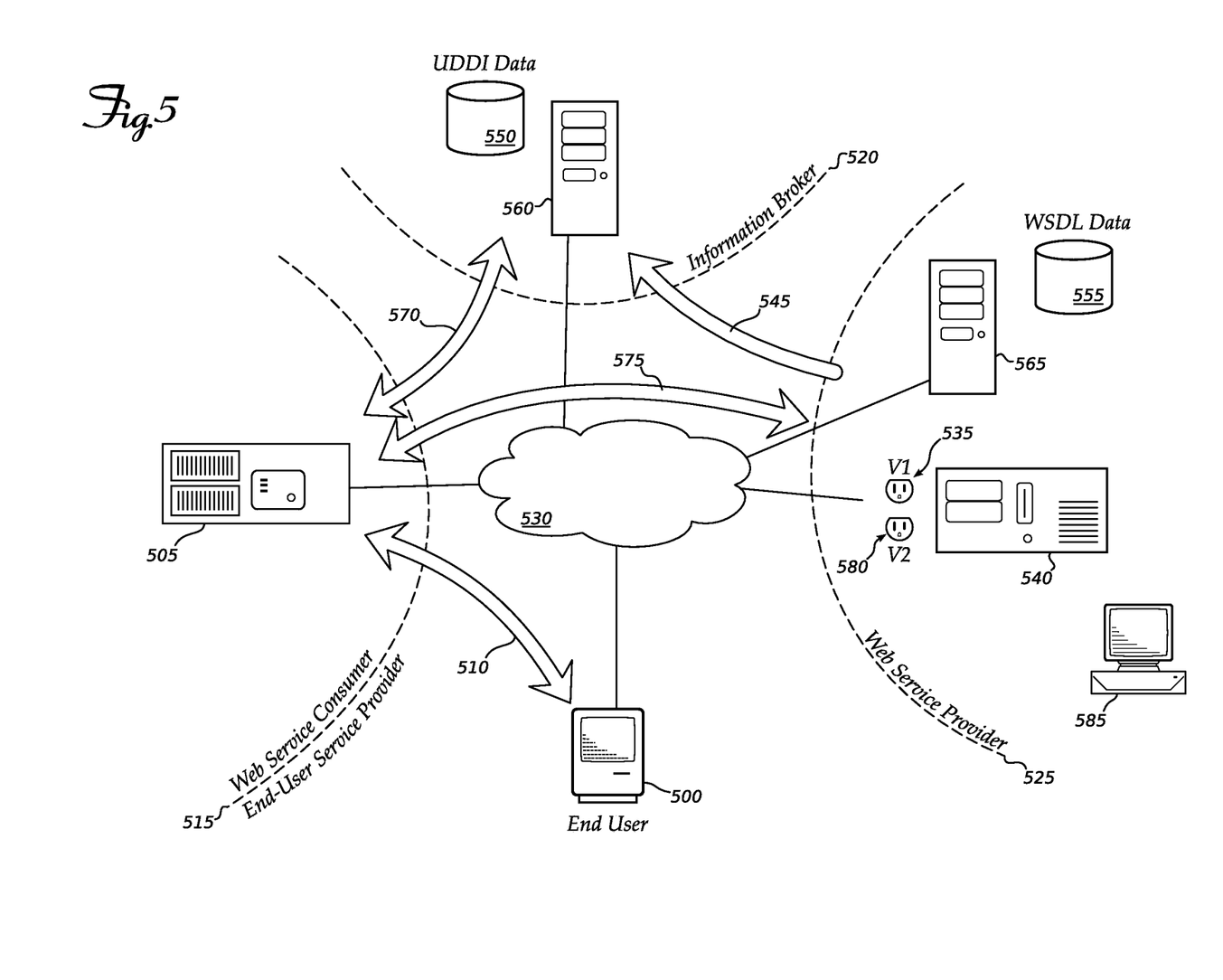
FIG. 5 provides an overview of a complete system.

FIG. 5 shows how a number of computer systems can interact according to an embodiment of the invention. The principal objective of all the interactions shown is to complete a transaction between a computer system 500 representing an end user and a second system 505 (the transaction, which may include several separate interactions, is represented as arrow 510). System 505 represents and is administered by an entity that is both an end-user service provider and a web service consumer; the entity's administrative scope is indicated by dashed line 515.

Other entities that participate and support the principal transaction between end user 500 and end user service provider 515 include information broker 520 and web service provider 525. Communication between various pairs of these entities can occur over a distributed data communication network 530. The Internet is one such network, but one or more private networks can also be used to carry information between communication peers.

Embodiments of the invention affect events and interactions occurring well in advance of the final end-user to end-user-service-provider transaction 510. First, a developer at web service provider develops and deploys a first distributed data service at a first network address, indicated in this figure as socket "V1" 535 on system 540. Information about the web service may be published to information broker 520 (see arrow 545) and incorporated in a database such as UDDI data 550. A Web Service Description Language ("WSDL") document describing the interface may be published to WSDL database 555. Information in databases 550 and 555 may be made available through information broker systems such as UDDI server 560 and web server 565.

A developer at end user service provider 515, preparing the distributed application that will eventually interact with end user 500, may query systems at information broker 520 to discover web services needed for the application. Upon locating UDDI data describing the web service available from web service provider 525, he may retrieve the WSDL document describing interface "V1" to the web service and incorporate that web service in the distributed application. Arrow 570 indicates the searching and interface description retrieval operations.

Once the distributed application is ready, transaction(s) 510 between end user 500 and end user service provider 515 can proceed; during this transaction, the distributed data processing service available from web service provider 525 may be invoked (arrow 575).

Finally, a new or updated version of the distributed data processing service may be prepared and deployed at web service provider 525. This new version is offered at a new endpoint, indicated as socket "V2" 580 in this figure. The existing service (or an equivalent shim or wrapper service) is still offered at the original network address indicated as socket "V1" 535. An administrator at web service provider 525 may use an administration tool running on workstation 585 to publish some information about this new service to information broker 520. If service version V2 is a backwards-compatible version of V1 (i.e. if V1-adapted clients can interact successfully with service V2), then the information about V2 may overwrite previously-published information about V1. New web service consumers, querying information broker 520, will discover service V2 and adapt their distributed applications to interact with the newer service version.

Although several separate entities and computer systems are shown in FIG. 6, those of skill in the art will recognize that the functions described can be consolidated and performed by a smaller number of entities and/or systems, or separated into smaller units and distributed among an even greater number of cooperating systems.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), and Electrically Erasable Programmable Read-Only Memory (EEPROM).

The applications of the present invention have been described largely by reference to specific examples and in terms of particular allocations of functionality to certain hardware and/or software components. However, those of skill in the art will recognize that selection of appropriate distributed data processing service interfaces can also be performed by software and hardware that distribute the functions of embodiments of this invention differently than herein described. Such variations and implementations are understood to be captured according to the following claims.

We claim:

1. A method comprising:
   deploying a first network-accessible data processing service at a first network address;
   publishing a description of an interface of the first network-accessible data processing service, the description to include the first network address;
   deploying a second network-accessible data processing service at a second, different network address; and
   overwriting the first network address in the description with the second, different network address.

2. The method of claim 1 wherein the second network-accessible data processing service can be accessed successfully by a client adapted to interact with the first network-accessible data processing service.

3. The method of claim 1, further comprising:
   registering the first network-accessible data processing service with an information broker.

4. The method of claim 3 wherein the information broker is a Universal Description Discovery and Integration registry.

5. The method of claim 1, further comprising:
   providing the first network-accessible data processing service to a client connecting at the first network address after deploying the second network-accessible data processing service and overwriting the first network address.

6. The method of claim 1, further comprising:
   providing both the first and second network-accessible data processing services with a single service implementation; and at least one of:
   deserializing request parameters differently between clients accessing the first and second network-accessible data processing services through the first and second network addresses; or
   serializing response parameters differently between clients accessing the first and second network-accessible data processing services through the first and second network addresses.

7. The method of claim 1 wherein the description of the interface of the first network-accessible data processing service is a Web Services Description Language ("WSDL") document.

8. A method comprising:
   providing a network-accessible data processing service at a plurality of service endpoints including a first service endpoint and a second service endpoint, the first service endpoint associated with a first network address and the second service endpoint associated with a second network address different from the first network address;
   publishing a formal description of an interface of the network-accessible data processing service available at the first service endpoint, the formal description including the first network address;
   overwriting the formal description with a second description of the interface of the network-accessible data processing service available at the second service endpoint, the second description including a second network address different from the first network address;
   accepting a request for the network-accessible data processing service at one of the plurality of service endpoints;
   deserializing the request according to the one of the service endpoints at which the request was received; and
   processing the request.

9. The method of claim 8, wherein the formal description of the interface of the network-accessible data processing service available at the first service endpoint is published as an Extensible Markup Language ("XML") document.

10. The method of claim 9, further comprising:
    publishing a Uniform Resource Locator ("URL") of the formal description in an information broker.

11. The method of claim 10 wherein the information broker is a Universal Description Discovery and Integration ("UDDI") server.

12. A non-transitory computer-readable medium containing stored instructions to cause a programmable processor to perform operations comprising:
    providing a business service of a business entity at a plurality of service endpoints including a first service endpoint and a second service endpoint, the first service endpoint associated with a first network address and the second service endpoint associated with a second network address different from the first network address;
    maintaining a hierarchical data structure to describe the business entity, the business service offered by the business entity, a binding template associated with the business service, and a link to a description of an interface of the business service, the description including the first network address;
    returning the description in response to a request for the link; and
    replacing the description if a new version of the business service is deployed without altering the link in the hierarchical data structure, the replacing including overwriting the description with a second description including the second network address.

13. The non-transitory computer-readable medium of claim 12 containing additional instructions to cause the programmable processor to perform operations comprising:
    returning data from the hierarchical data structure in response to a query.

14. The non-transitory computer-readable medium of claim 12 containing additional instructions to cause the programmable processor to perform operations comprising:
- performing a first distributed data processing service in response to a request received at a first service port; and
- performing a second distributed data processing service in response to a request received at a second service port.

15. A system comprising:
- means for providing a first distributed data processing service accessible at a first network endpoint;
- means for providing a second distributed data processing service accessible at a second network endpoint;
- means for publishing a description of an interface to the second distributed data processing system at a Uniform Resource Locator ("URL") associated with a description of an interface to the first distributed data processing service; and
- means for overwriting a first network address associated with the first network endpoint with a second, different network address associated with the second network endpoint.

16. The system of claim 15, further comprising:
means for responding to a query seeking a distributed data processing service.

17. The system of claim 15, further comprising:
means for determining a desired version of a data processing service based on a URL at which a request for the data processing service is received.

* * * * *